(12) United States Patent
Evenhouse et al.

(10) Patent No.: US 9,135,662 B2
(45) Date of Patent: Sep. 15, 2015

(54) METHOD AND SYSTEM FOR COMMUNICATING FINANCIAL NEWS

(71) Applicants: Kevin W. Evenhouse, Chicago, IL (US); Matthew J. Andriusis, Orland Park, IL (US)

(72) Inventors: Kevin W. Evenhouse, Chicago, IL (US); Matthew J. Andriusis, Orland Park, IL (US)

(73) Assignee: Algo Innovations, LLC, Chicago, IL (US)

( * ) Notice: Subject to any disclaimer, the term of this patent is extended or adjusted under 35 U.S.C. 154(b) by 0 days.

(21) Appl. No.: 14/092,522

(22) Filed: Nov. 27, 2013

(65) Prior Publication Data

US 2014/0149315 A1    May 29, 2014

Related U.S. Application Data

(60) Provisional application No. 61/730,788, filed on Nov. 28, 2012.

(51) Int. Cl.
G06Q 40/00    (2012.01)
G06Q 40/06    (2012.01)
H04L 12/18    (2006.01)

(52) U.S. Cl.
CPC ............ *G06Q 40/06* (2013.01); *H04L 12/1859* (2013.01)

(58) Field of Classification Search
CPC ....... G06Q 10/00; G06Q 20/00; G06Q 30/00; G06Q 40/00
USPC .......................................... 705/3–44
See application file for complete search history.

(56) References Cited

U.S. PATENT DOCUMENTS

| | | | |
|---|---|---|---|
| 7,034,691 B1 * | 4/2006 | Rapaport et al. | 340/573.1 |
| 7,415,664 B2 * | 8/2008 | Aureglia et al. | 715/212 |
| 7,756,807 B1 * | 7/2010 | Komissarchik et al. | 706/46 |
| 7,890,533 B2 * | 2/2011 | Pollara | 707/790 |
| 7,925,708 B2 * | 4/2011 | Davis et al. | 709/206 |
| 2004/0059705 A1 * | 3/2004 | Wittke et al. | 707/1 |
| 2007/0067297 A1 * | 3/2007 | Kublickis | 707/9 |
| 2009/0177745 A1 * | 7/2009 | Davis et al. | 709/204 |
| 2012/0191730 A1 * | 7/2012 | Parikh et al. | 707/754 |
| 2012/0203853 A1 * | 8/2012 | Davis et al. | 709/206 |

* cited by examiner

*Primary Examiner* — Frantzy Poinvil
(74) *Attorney, Agent, or Firm* — Pauley Erickson & Kottis (57) ABSTRACT

A system and software-implemented method for reporting financial market news and events. Machine-readable extracted data is reformulated in content and format to provide a more efficient display and understanding of the relevance of news and events to the end user. Audio and/or graphic indicators are added to further promote efficient understanding of the delivered news or event message.

20 Claims, 3 Drawing Sheets

METHOD AND SYSTEM FOR COMMUNICATING FINANCIAL NEWS

CROSS REFERENCE TO RELATED APPLICATION

This application claims the benefit of U.S. Provisional Patent Application Ser. No. 61/730,788, filed on 28 Nov. 2012. The Provisional Application is hereby incorporated by reference herein in its entirety and is made a part hereof, including but not limited to those portions which specifically appear hereinafter.

BACKGROUND OF THE INVENTION

1. Field of the Invention

This invention is directed to a method, system, and/or software for compiling, sorting, searching, filtering, referencing, and manipulating news and event reports, such as financial market related information, to produce audio, graphical, and/or textual message formats to help provide for faster human processing of real-time financial news and market events within a user interface.

2. Discussion of Related Art

Everyone intuitively understands that financial news and notable market events can move markets. Market participants serving various roles heavily depend on time sensitive news and other market information to help drive decision making. Ideally, market information should be fast, accurate, and informative to uncover opportunities, manage risk, and boost productivity. However, with the exponential growth of global internet connectivity, mobile platforms, social media, online content sharing, and other technological related advancements the market information paradigm is changing quickly. Market participants around the globe are bombarded with too much information (20,000+ news events per business day) for the human to effectively comprehend and use effectively.

There is a continuing need for an improved financial market news and/or event communication system that can extract relevancy, condense content and/or otherwise manipulate information into more human consumable messaging formats.

SUMMARY OF THE INVENTION

Similar to a financial news room which reports on the most notable happenings, the method, system, and software of this invention provides or receives relevant events, key analytics, and other actionable data that have been extracted from various financial related sources, broadcasted events data, and more particularly financial market news broadcasts. The present invention manipulates the source data into formatted text/graphical and/or audio broadcasts, using text-to-speech technologies, to help the consumer user interact with information in a way that is easy to discover, absorb and react upon with deep insight.

The general object of the invention can be attained, at least in part, through a method for communicating information. The method comprises: providing and/or receiving a continuous feed of relevant data extracted from a data broadcast; automatically creating output data messages from the extracted relevant data, wherein the output data messages differ in content and/or format from the continuous feed of relevant data and the data broadcast; and automatically delivering the output data messages to a user device.

The invention further provides a method for communicating information that comprises: providing a plurality of pre-determined message templates stored in a database; providing and/or receiving relevant data extracted from a data broadcast; automatically selecting a corresponding message template from the plurality creating message templates for the extracted relevant data; automatically populating the selected corresponding message template with the extracted relevant data to create an output data message; and automatically delivering the output data message to a user device.

The method and system of this invention provides a user-friendly output message that summarizes and displays, or otherwise provides, the relevant data of broadcast news and event information. The broadcast news and event information can be from any suitable news source that provides electronic and/or machine-readable news information, and the extracting of the relevant data from the broadcast news can be performed by the method, system, and software of this invention or received from another source, such as a third party provider.

The method and system of this invention can use the extracted key or relevant data from the news broadcast to automatically populate pre-existing event templates. The method and system also desirably ranks the importance of the information to the intended user, such as by market importance, relevance, novelty or other sentiments. The ranking of each data communication can be on a numerical and/or letter scale, and desirable includes a graphical representation of the ranking in the final output message. The method and system preferably automatically associates at least one of one of a plurality of audio indicators and/or graphic indicators to each output message, and particularly to at least highly relevant output messages. The graphical representation can be any established color and/or shape that is associated with the ranking in the output message delivered to the user. The graphic indicators improve the receptivity of the information by the user, by allowing for a faster, more efficient review of the delivered information. Audio indicators can be selected from predetermine sound effects to be associated with the output message to signal importance and relevance to the particular user. In another embodiment of this invention, highly relevant messages are provided in spoken audio messages instead of or along with the text/graphic messages. The audio output message can be obtained through text-to-speech technologies.

The method and system of this invention are desirably implemented by software, including encoded, computer executable instructions for the method steps, and stored on a non-transient recordable medium and/or database of a server computer or other data processor in combination with. The server would have access to an Internet or other communication connection that allows receiving broadcasts or other data and delivering the final output message to a remote user device, such as a user computer, smartphone, and/or tablet, including the option to deliver final output messages or related information through an application programming interface (API) for end users to customize accordingly.

BRIEF DESCRIPTION OF THE DRAWINGS

These and other objects and features of this invention will be better understood from the following detailed description taken in conjunction with the drawings.

DESCRIPTION OF PREFERRED EMBODIMENTS

Figure 1:
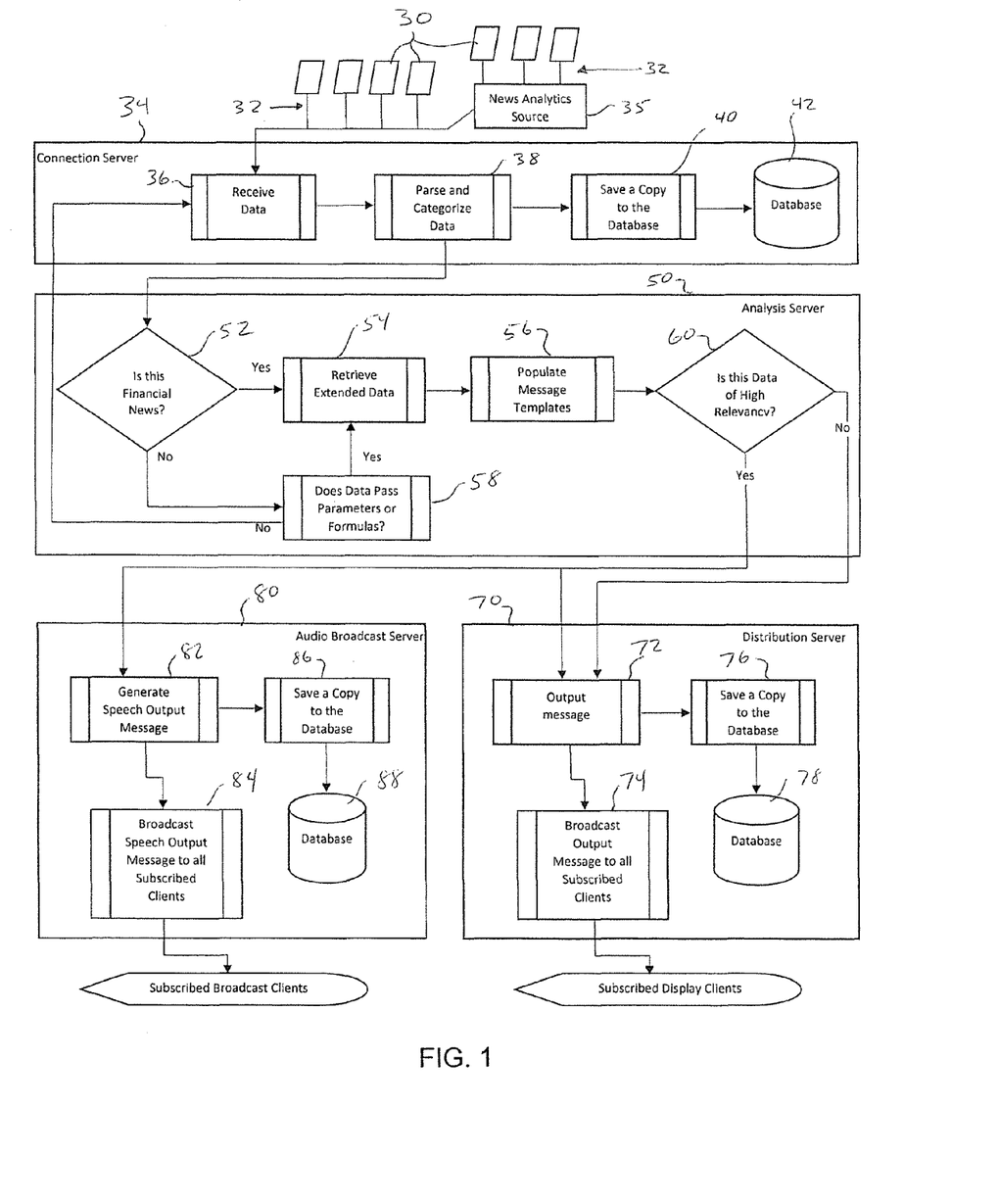
FIG. 1 is a flow diagram of the method according to one embodiment of this invention.

FIG. 1 generally illustrates a method for communicating information according to one embodiment of this invention. The method begins with one or more broadcasted news feeds from at least one news source 30. The news sources 30 shown in FIG. 1 are each third party news sources, but one or more news sources can be owned and operated by the same entity as operating the method of this invention. Exemplary news sources include, without limitation, textual financial news providers, trading exchange market data sources, trading exchange message data report sources, media scraping sources (e.g., Mozenda.com, Moreover.com, Fetch.com, Recordedfutures.com, etc.), and social media sources (e.g., Twitter.com, GNIP.com, DataSift.com, Stocktwits.com, etc.). The sources 30 disseminate data broadcasts 32 that are received by a connection server or module 34. Each data broadcast 32 can be a single news item, or include more than one news item.

The method of this invention uses extracted relevant information from each data broadcast to create one or more different, desirably shortened or summarized, output data messages that is easier to review quickly and efficiently by the end user than the original data feed broadcasts 32. In one embodiment of this invention, the extracted relevant data is desirably received from a third party data vendor 35, such as RavenPack or Thomson Reuters, which provides machine-readable news analytics, such as including real-time structured sentiment, relevance, and novelty data for entities and events detected in the unstructured data broadcasts 32, and machine-readable indictors, such as company sentiment indicators, macro sentiment indicators, and/or global economic numbers. Other exemplary data types that can be received by the method and system of this invention include, without limitations, trading exchange market and message data, technical market data indicators, internal market data indicators, social media data, and web scraping data.

Referring to FIG. 1, the data is received by the server 34 in box 36 and then parsed and/or categorized in box 38. In step 36 any further extraction of data broadcasts 32 can occur, such as for the data broadcasts directly obtained from sources 30. A copy of the data can be saved to database 42 in step 40.

In embodiments of this invention the extracted relevant data is used to create an output data message that is delivered to the client end user. As used herein, the term "relevant data" refers to information, and generally text/numerical data, from the data broadcasts that would be considered useful or necessary to an end user. In general, the relevant data is of particular importance to many end users, but there may be client end users who may have different market narratives and information needs than others. The extracted relevant data is reassembled into new output message that desirably differ in content and/or format from both the feed of relevant data and the data broadcasts 32.

The extracted relevant data can be automatically assembled into the outlet message in any suitable way. In the embodiment of FIG. 1, a plurality of pre-established message templates are stored in a database for use in generating the text content of the output data message. The system can automatically select the appropriate template for the extracted relevant data and automatically populate the selected corresponding message template with the extracted relevant data to create an output data message. Any suitable templates can be included for use in the invention, depending on need, such as providing templates tied to particular financial market events. In embodiments of this invention, different templates may be provided for delivering the relevant data by audio message and graphic/text message.

In FIG. 1, an analysis server 50 determines whether the extracted relevant data is, or is from, financial news in step 52. If yes, the data and/or corresponding message template is retrieved in step 54 and the message template is automatically populated in step 56. If no, the data is analyzed in step 58, such as to determine whether the news is sufficiently relevant or meets parameters to forward on to the end user in an output message. If the data is determined to be sufficiently relevant or meets parameters, then the relevant data is used in steps 54 and 56, as discussed above. As an alternative to pre-established message templates, the system can automatically create a message directly from the extracted relevant data, such as following established algorithms for organizing the extracted data into readable messages.

In another embodiment of this invention, the relevancy is determined before populating the message, such as to not waste system resources for messages that won't be sent. For example, only highly relevant data are created into output messages and forwarded on to end recipients. In another embodiment of this invention, the method is dependent on the data package of the end user. For example, End User A can subscribe to receives all news events with any available news analytics data, including the most relevant news event happenings in audio message formats. End User B only subscribes to receive determined relevant news event data, including the most relevant news event happenings in audio message formats.

In step 60, the system determines whether the data is of high relevancy, so as to determine what format(s) to use, e.g., audio and/or text, to forward the data to the end recipient. In embodiments of this invention, a pre-established weighted taxonomy is used for determining highly relevant data. The method can be multilayered with each category of data typically having its own specific relevancy algorithm and/or scale. For example, when an incoming event is identified, the system matches the incoming event to the corresponding stored events formula which is used to measure relevancy, or importance of the event. Exemplary entities or categories include Company, Place, Economy, Society, Political, Asset Class, Organization, etc. with each entity group having multilayered category subgroups ending in "event type".

Figure 2:
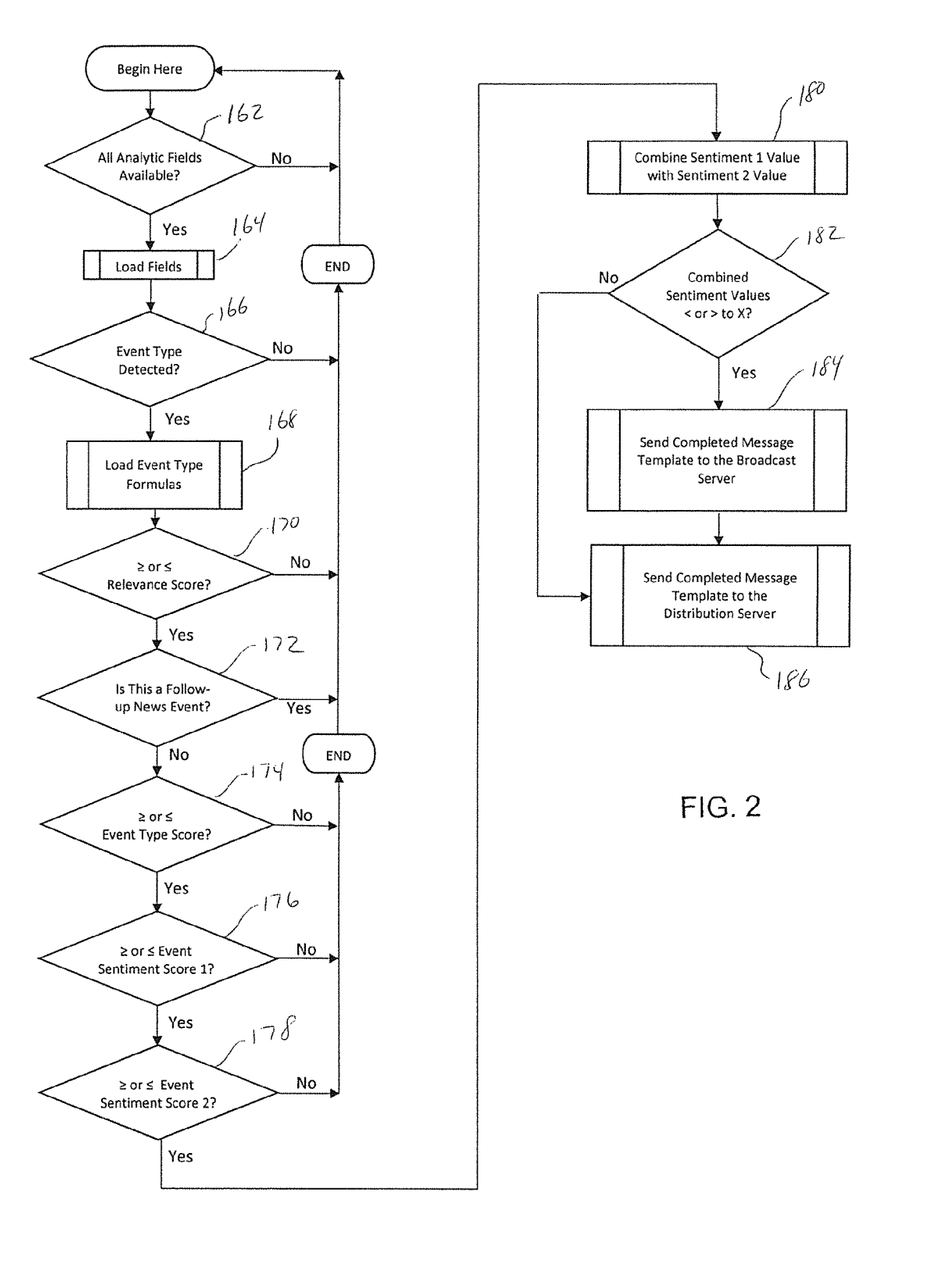
FIG. 2 is a flow diagram of the step of determining high relevance for data, according to one embodiment of this invention.

FIG. 2 illustrates an exemplary embodiment of a relevancy decision performed during step 60. In step 162 the analysis server 50 checks to ensure all analytical fields are available or located. The server 50 then loads the appropriate/called fields in step 164. The server 50 next confirms the "event type" field is ready in step 166. In step 168, the server 50 loads the pre-established formulas assigned for the "event type" field detected. In step 170, the server 50 compares a predetermined ranking formula to the vendor's numerical value of the "relevance" field score provided with the extracted relevant data. In embodiments of this invention, the ranking formulas, or scores, include high positive relevancy values and low negative relevancy values. Numbers between these high and low values are considered neutral events. The server 50 determines if the field score is greater than or equal to the positive relevancy value or less than or equal to the negative relevancy value. The server 50 then validates the numerical hierarchy of prior stories about the same event for the same entities in step 172. The decay function values according to an embodiment of this invention are 100=First Event Detected, then 85=Second Event Detected, then proceed using, 76, 54, 32, 24, 18, 13, 10, 8, 6, 4, 3, 2, 2, 1, 1, 0 . . . within an 18 hour window.

The server 50 next compares a corresponding predetermined numerical relevancy formula to: the vendor's numerical value of the "event type" or "category" field score in step 174; the vendor's numerical value of the "event sentiment 1" field score in step 176; and the vendor's numerical value of the "event sentiment 2" field score. In step 180, the server 50 combines the sentiment values of steps 176 and 178 together. The server 50 then compares the combined sentiment number in step 182 to predetermined numerical value to decide if the current event is of major significance. If the data is determined to be highly relevant, then the server 50 forwards the message template to both the audio server 80 in step 184 and the distribution server 70 in step 186. For less relevant data, the server 50 forwards the appropriate message template to only the distribution server for text/graphic delivery only in step 186.

Below is a simple, exemplary summary of the flowchart of FIG. 2, including exemplary predetermined numerical value thresholds.

Entity: Company
Company Name: XYZ
Event types: IF (earnings, analyst ratings, credit ratings, mergers, acquisitions, product recalls, shooting, explosion, etc.) THEN assign;
High Positive Relevance: (6: relevance), (70: event type), (60: event sentiment 1), (6: event sentiment 2), and (130: combined sentiment value)
Low Negative Relevance: (32: relevance), (30: event type), (40: event sentiment 1), (40: event sentiment 2), and (80: combined sentiment value)

The system would use these numbers (formula) in comparison to the "actual" news analytic field (numbers) when an incoming "event type" is detected. The system can supports numerous event types, or event categories associated with these entity types.

The output data messages of this invention can include, or communicate the relevant data through, text, graphics, and/or audio components. In the embodiment of FIG. 1, a distribution module or server 70 finalizes and sends output data messages that are text and/or graphic based. The server 70 generates the final output data message in step 72, and desirably saves a copy to a database 78 in step 76. The server 70 then broadcasts the output data message to the subscribed end user recipients in step 74.

In the embodiment of FIG. 1, the extracted relevant data can also be delivered to subscribing end user recipients via or with an audio message. In FIG. 1, an audio broadcast module or server 80 generates a speech output data message, or optionally an audio component to be added to the output data message of server 70, in step 82. The speech message can be created by any suitable speech synthesis program, as are known and available. In one embodiment of this invention, the messages can incorporate voice pitch and speed changes and/or different voices for different aspects of the relevant data, depending on the type of data (e.g., general news vs. market moving information). Sound effects can also be included in the audio message, or in non-spoken text messages, with different sound effects having different connotations as a function of the data message. The server 80 desirably saves a message copy to a database 88 in step 86. The server 80 then broadcasts the audio output data message to the subscribed end user recipients in step 84.

In embodiments of this invention, the extracted relevant data is ranked or otherwise assigned a value, such as a numerical value or a letter ranking. The ranking value is desirably communicated in or with the output data message to provide for a quick understanding of the importance of the output data message. To further promote efficient understanding of the output data message, graphic indictors are added to the output data message. A plurality of graphic indicators are established and desirably tied to the importance ranking to visually demonstrate the importance of the data within the message. In additional embodiments, predetermined graphical icons can be used to represent event categories or other information in the output data messages, for easy visual referencing.

The graphic indicators can incorporate color and shape, and can be different for different categories. In other words, each output data message can include more than one ranking category, and each ranking category has a different visual indicator. As one example, a numerical ranking scale can be divided into portions, and each portion is associated with one of several related graphic indicators. The graphic indicators can include, for example, filled and empty squares that are also colored red and green, with a scale including a red filled square at one end, a red hollow square, a green hollow square, and a green solid square at the opposing end of the scale. The numerical or letter value for the indicator can be displayed, for example, in the middle of the corresponding square. To further divide the scale, red or green colored and/or non-colored numbers can be used to indicate middle portions of the scale. An alternative indicator for a different category of information can, for example, include orange circle having two or more fill levels.

Figure 3:
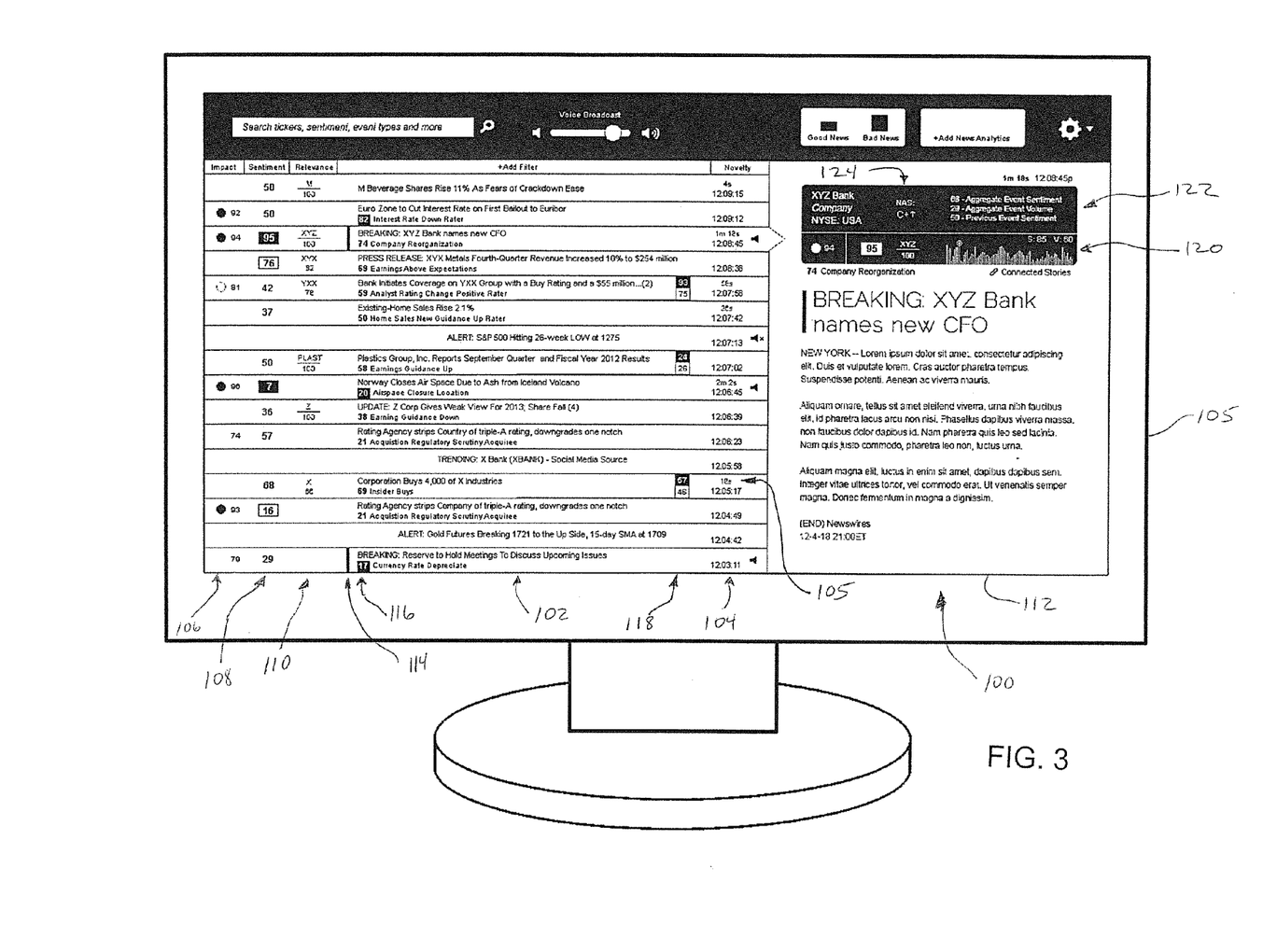
FIG. 3 shows an exemplary user interface according to one embodiment of this invention.

FIG. 3 illustrates a user interface 100 displaying output data messages related to financial market events on a computer screen 105, according to one embodiment of this invention. The user interface 100 includes several columns and rows, with each row including one output data message. Column 102 includes the text of the output data message. Column 104 provides a time stamp of the message, and optionally above the time stamp is provided a stop watch time stamp 105 relating to event "global novelty" in comparison to other news vendors releasing the same story prior to the system announcement. Column 104 also includes an audio icon which represents that the corresponding event was audio broadcasted via text-to-speech. Columns 106-110 indicate ranking or other information for the output data message, with column 106 including impact ranking, column 108 including sentiment ranking, and column 110 including relevance ranking for the underlying entity and/or information.

As seen in FIG. 3, different graphic indicators are used for the different ranking metrics. The impact ranking, in column 106, includes a first plurality of graphic indicators that include empty and filled circles, shown in any desired color. A filled circle, for example, can be used to indicate a ranking of 100-90 and an empty circle can be used to indicate a ranking of 89-80. Rankings below 80 are shown without a graphic, but can optionally include variations of the circle, depending on need.

The sentiment column 108 includes a second plurality of graphic indicators that are desirably different from the graphic indicators used in column 106, such as in both shape and color. The sentiment indicators of column 108 use empty and filled squares, such as with two colors, green (to indicate high ranking) and red (to indicate low ranking). As an example, a solid green square can be used for rankings between 100-86, a hollow green square for rankings of 85-75, green numbers without a shape for rankings of 74-65, numbers alone for rankings of 64-46, red numbers for rankings of 45-36, a red hollow square for rankings of 35-25, and a red solid square for the lowest rankings of 24-0. A legend, not shown, can be included as a reminder of the ranking indicator scale.

In the relevance column 110, the corresponding market ticker number is shown over a relevance number. A horizontal line graphic indicator is added between the ticker and relevance number for emphasis of 100% relevance rankings. Other colors and indicators can be used, such as for output data messages that do not receive the rankings of columns 106-110, such as green font as a positive indicator, red font as a negative news, and blue font as a trending indicator. As will be appreciated, various indicators, shapes, and colors can be used according to need or aesthetic effect.

The user interface 100 can include other features, such as a window 112 for displaying the original, full data broadcast when the corresponding output data message is selected. The user interface also includes a volume and/or mute function for controlling any automatic audio indicators or messages tied to the output data message. As will be appreciated, the feature, components and configuration of the user interface can vary depending on need, such as having a mobile layout for displaying on smaller mobile device screens. Column 114 indicates the news type such as breaking news or news flash with a solid line when applicable. Column 116 indicates event sentiment or other information when applicable. Column 118 indicates entity aggregated sentiment and news volume or other information when applicable. Section 120 provides vertical lines depicting news volume over a set period of days, with red vertical lines representing negative news and green vertical lines representing positive news. To view news articles associated with a vertical line, mousing over and left mouse clicking will open up the news event or events. Horizontal rows 122 represent aggregated news sentiment fields and can be red or green in text color to represent negative or positive indications. Section 124 depicts short term news sentiment using a numerical grading scale and an up or down arrow representing upward positive news momentum or downward negative news momentum.

The present invention is described in further detail in connection with the following examples which illustrate or simulate various aspects involved in the practice of the invention. It is to be understood that all changes that come within the spirit of the invention are desired to be protected and thus the invention is not to be construed as limited by these examples.

EXAMPLES

The following examples demonstrate operation of the invention using different data feed components.
Machine-Readable News & Analytics Incoming news & analytics data can come from the same vendor (news source publisher) or from two separate vendors, e.g., a news source publisher and a third party data vendor. As discussed above, the data vendor extracts key analytics from the news source vendor's published events. For example, a news vendor (news source publisher) will partner with data vendor to create and distribute "machine-readable news analytics" for application consumption purposes. The example below receives data from a third party data vendor.

The data vendor's data feed is delivered as "machine-readable" or "structured" data. Because of this the system is programmed with pre-established formulas and parameters to determine what's highly relevant. Below is an example of how the system detects a highly relevant news event and how a textual message template is configured and retrieves extended data to populate an output data message for the audio broadcast server. This particular example shows "Trading Exchange Market Data" as extended data being retrieved to complete the message string.

Data Vendors: Machine Readable News & Analytics Vendor Data
  Global Novelty=1 Minute 18 Seconds Late
  News Type=Breaking News
  TICKER or Tradable Asset(s)=Stock, XYZ
  Event Sentiment=High Positive
  Headline or Event Type=CEO Announces Restructuring
  News Impact Projections=Market Impact HIGH (converted, such as described above, from vendors output "95" measurement)
Data Vendors: Trading Exchange Market Data
  Price Movement Rating=Spiking Higher
  Volume=Heavy Volume
  Real-Time Quote=Trading at 605.45

The textual message template is sent to the audio broadcast server as a speech output message that reads: "1 Minute 18 Seconds Late, Breaking News, Stock XYZ, High Positive, CEO Announces Restructuring, Market Impact HIGH, Spiking Higher, Heavy Volume, Trading at 605.45." A simpler, shorter approach for the above example could be a speech output message that reads: "Breaking News, Stock XYZ, High Positive, Spiking Higher". In either case the end user was notified in audio and if needed can reference the full details within the application where the end user has access to further event details.

This example is hard coded to be processed automatically by the system. Once the incoming news event has been detected as high relevancy it's to be processed and disseminated automatically.

Certain scheduled events are highly anticipated and our system allows for manual soft code as needed. For example, when earnings for ABC Company is to be released at 3:15 pm, with $8.50 per share earnings estimated, the following message template can be prepared beforehand to be automatically disseminated accordingly when the scheduled event is released over the data broadcast.

IF earnings<$8.50 THEN report ("ABC earnings below estimates")
  ELSE
  IF earnings>$8.50 THEN report ("ABC reports earning above estimates")
  ELSE
  IF earnings=$8.50 THEN report ("ABC reports earnings inline")

The finished textual message templates in the above examples are considered complete with the pre-established expectation and are ready to be disseminated automatically when updated upon receiving the difference between the further extracted relevant data and the pre-established expectation accordingly.

Exemplary extracted relevant (structured) data can include, without limitations, various fields or attributes such as event type (1,300+ categories), entities detected, relevancies, news event sentiments, story body sentiment, various company aggregated sentiments, news types, item genre, scheduled/unscheduled, headline sentiments, industry, region, text size of story, type of story, location of first mention of relevant entity detected, total key word count, number of company mentions, event index, event count, linked count, more to follow, ticker or tradable asset(s), trading vehicle mention, prevailing aggregated sentiment, previous event sentiment, author sentiment, uniqueness, news volume, news volume good, news volume bad, pure text sentiment (full), news impact projection, event novelty, event global novelty (comparing event to other publications or news sources), time elapsed (since last event for the underlying entity or since last related/follow-up event), event specific sentiment, source, etc. The system collects and stores these data attributes in a database to construct various functions, tools and features within a user application environment.

Machine-Readable Economic Numbers, Indicators & Corporate News Event Data Releases Most numbers related releases are scheduled, meaning it is known at what time and from whom the numbers data is expected. One primary example could be various Government Lock-up rooms. As mentioned in the prior example, the system can automatically pre-populate, or manually soft code, the appropriate textual message templates to accept the scheduled incoming numbers data and populate the numbers field accordingly. Depending on the actual number released the system will choose to automatically insert "higher than projected" or "lower than projected" or "as projected". The system also populates the message string with the actual number being released. Example, unemployment numbers are to be released at 9:00 am with 7.5% projected. The actual release at 9:00 am was 8.1%. The template would populate accordingly and can read "8.1%, higher than projected." This textual message template is sent to the audio broadcast server as an audio output message. In this scenario, a second text message template was populated for the same event to be disseminated through the Distribution Module or Server for visual reference. The example above can read "Unemployment Release: 8.1%, higher than projected."

The system also desirably provides warning messages prior to the number coming out letting users know something is scheduled, and provides any projected numbers (prior to release) the market is expecting, if available. The system can do so in both audio and text output data messages. If there is any textual commentary or an article that accompanies the number just released the system desirably automatically treats it just as any other news event so it's displayed with any underlying analytics. For example, at 8:50 am when unemployment numbers are coming out at 9:00 am, the system reports: "Warning, unemployment numbers being released at 9 am today, 7.5% unemployment rate projected", and then at 8:59:35 am: "Warning, Numbers Pending", and then when the actual number comes out: "8.1, higher than projected" The numbers can also be indicated with a graphic indicator, such as along with or within a colored directional arrow indicating the higher or lower than expected result.

It's common for number releases to be accompanied or closely follow published commentary. If applicable, the system can automatically disseminate the "structured" news analytics associated with that release to help users quickly grasp deeper insight into the numbers just released.

Exemplary Corporate number releasing categories can include multiple global public companies EPS (earnings per share), EPS Adjusted, Profit and Revenue. Exemplary economic number releasing categories can include, without limitations, both U.S. houses of Congress, White House, Fed, Bundes bank, ECB, Governments of all G-7 nations, Central Banks of all G-7 nations, Government lock up room releases and embargoed news, Central Bank decisions, Industrial Output, FX Reserves, Money Supply Figures, GDP, Employment Figures, credit ratings, Corporate Earnings and or revenues, European and North American private numbers such as U.S. Institute for Supply Management, Housing Statistics, CPI figures, Worldwide Treasury Auctions, anything extracted from a news article or commentary, U.S. Department of Labor, U.S. Department of Treasury, US Department of Commerce, The Conference Board, National Association of Realtors, USDA, Statistics of Canada, Bank of Canada Europe, European Central Bank, Peoples Bank of China, Chinese Ministry of Commerce, Bank of Japan, Bank of Australia, Bank of England, Office for National Statistics, Z.E.W, Institute for Economic Research Info, German Ministry of Economics, Eurostat, Govt. Indicator Numbers and Messages, etc.

Trading Exchange Market Data

The system can use trading exchange market data to spot notable trading activities, detect stocks moving on news and for price quote and volume referencing when building various textual message templates. The system automatically tracks thousands of assets to look for notable price and volume moves. When a notable move is detected an output data message is created, such as "Alert! XYZ Spiking" or "Alert! XYZ Running" or "Alert! XYZ Jogging," where: "Spiking"=moved instantly, "Running"=moving fast, "Jogging"=moving mediocre. A more informative example is: "Alert! XYZ Spiking Higher, Up 2.2 Percent, Trading at 26.55, Heavy Volume." In one embodiment of the invention, the system tracks the ticker symbols for X amount of minutes after a news article has been released. If notable price or volume actions are detected a textual message template is created, for example: "Alert! XYZ moving on news" or "Alert! XYZ moving on news, Up 2.2 Percent."

Price quotes and volume information can automatically be pulled to populate fields within a textual message template that's news related. For example "Breaking News, ABC Spiking Higher, Heavy Volume, Trading at 605.45." The first two fields are from the news feed, "Breaking News" and "ABC," while the rest of the string is considered Trading Exchange Market Data. Other notable trading activities that are monitored include, without limitation, key price levels, support/resistance levels, various time period highs/lows such as "touching 2 week high", significant stop orders, intraday volume reports, assets with unusual trading volume, unusual options trading detected, breakouts, breakdowns, advancing stocks/declining stocks with volume reports, high frequency surge detections, etc.

Trading Exchange Message Data Reports

The system desirably receives all incoming messages from the underlying exchanges it's subscribed to and processes the incoming messages and understands the priority levels. If the data is of high priority such as a "circuit breaker," "trading halt," "alerts," "corporate action," etc. the system knows that it needs to be further parsed and disseminated. Not all trading exchange message data reports are the same. Some are just machine readable text strings while others, such as the "Imbalances" explained below, are going to be XML or CVS files which contains more data complexities and require more steps to parse and disseminate.

The NYSE and NASDAQ exchanges both offer "imbalances" at certain times of the day. The example below is directed to end of day imbalance prior to the equity markets closing. To facilitate buyers and sellers the exchanges publish "Market On Close" or "MOC" orders at 2:45 pm, 15 minutes before the cash close. The main function behind the exchange sharing this key data is to offset any heavy buying or selling which needs to happen at the close of the market. The exchanges may have an abundance of orders for several stocks that need to find liquidity on the other side. Understanding this data allows traders to participate with these liquidation needs.

In one embodiment of this invention, the system connects to a Trading Exchange Message Data Report vendor subscriber feed ready to accept incoming data. The system receives Imbalance messages data, and the system parses the Imbalance data. Parsed data is sent to the analysis module or server to be analyzed/processed for liquidity buying or selling imbalance measurements, and the analysis server populates textual message template with message of relevancy. The analysis server sends data to the audio broadcast server which generates speech synthesis and broadcasts to all connected end users. The audio broadcast server saves an audio copy of the speech synthesis broadcasted message to the database for copyright, legal, and general business purposes. The analysis module or server also sends processed data to the distribution server and saves a copy to the database for logging and searching capabilities. The distribution server sends formatted text and related visual graphics to all end users. The above example is desirably fully automated, and also applies to other data types.

Technical Market Data Indicators "Technical Market Data Indicators" and "Internal Market Data Indicators" are considered close in comparison. On a more granular level Internal Market Data Indicators are made up of aggregated movement data collected from multiple securities, not one, to measure various types of market "breadth", and have their own ticker symbols. These formulas are calculated and processed by each vendor, with each vendor supporting their own unique ticker symbols. The most popular "breadth" indicators could be TICK and TRIN. Technical Market Data Indicators are formulated from either multiple securities or just one security and do not have ticker symbols and are generally what's being charted along with an asset or assets. Technical Market Data Indicators are used in conjunction with other data to help validate, or help provide perspective on a securities strength and direction. In one embodiment of this invention, the system uses these indicators to help track relevant trading actions associated with the most popular, widely watched assets.

The system can use the Technical Market Data Indicator by itself or in tandem with other data feeds, such as Trading Exchange market Data or "price." (Trading Exchange Market Data) in the example below.

Parameter: IF Gold Futures trade at 1352 THEN populate textual message template, ELSE loop.

Message Template Example: "Gold futures now trading at 15 day Simple Moving Average of 1352."

If, for example, oil is spiking higher then the equity markets tend to sell off. A predetermined message template for oil and equities can be provided in the database and used as they become a focal point and are moving fast. This is similar to a news room that turns attention to a particular event and begins reporting relevance several times throughout the day.

Parameter: IF Oil Futures trade at 96.48 THEN populate textual message template, ELSE loop.

Message Template Example: "Oil Futures now trading at 96.48, trading at Resistance, up 3.7 Percent"

In this example the price 96.48 is resistance on the upside; resistance is a Technical Market Data Indicator.

Internal Market Data Indicators

The system can use Internal Market Data Indicators to alert, confirm and help predict price action of the overall market. Several times a day the S&P 500 TICK will hit extremes on the upside and on the downside. When these extreme highs and lows happen, systems parameters are desirably triggered and a textual message template is pulled, or created to disseminate in the same similar fashion as previous examples.

The system can also track volume for each tick index watched. When an extreme TICK is triggered, the analysis module or server pulls that index volume aggregate to inform users of volume, or breadth type (light volume, heavy volume). For example: "TICK upside extreme, light volume," or "TICK downside extreme, heavy volume."

At specified times throughout the day, the system can automatically report on the general volume/breadth aggregates for that day in comparison to an average. For example: "NYSE and NASDAQ seeing average volumes" or "NYSE and NASDAQ seeing heavy Volumes."

Twitter, Stock Twits & Other Social Media Data

Using a combination of vendor solutions and system measurements and methods the system can alert or inform subscribers of possibly noteworthy market-relevant information, noteworthy events, and emerging trends, such as trending sentiments, trending stocks, trending topics, trending conversations tied to events, notable market data event extractions, news events, sentiment tied to events detected, asset sentiments, index sentiments, volatility sentiment scores, etc. associated social media related sources. Similar to the creation of textual message templates for various categories, waiting to be populated with relevant data, social media categories are no different. The database desirably includes a library of message templates that cover a multitude of categories and have specific parameters for which the system automatically looks for. The system administrator monitors and updates these parameters as necessary. For example, the system can be instructed to automatically extract and emit the top 3 trending stocks from StockTwits and disseminate at any predetermined time. The output data message can read, for example: "Top stocks trending today are XYZ, ABC, and LMNOP."

In one embodiment of the invention, if the analysis module or server "validates" the relevancy of an actionable signal just received, then the analysis module or server will process the event accordingly. If "high relevancy" is "yes," then the data loads into a textual message template to be sent through the automated audio broadcast server and also disseminated through the distribution server for visual referencing. The subscriber will hear the alert and can confirm what was heard by reviewing the visual text and related graphics. Another example is when a new trend on StockTwits is detected the end user hears a synthetic voice broadcast announce "New Trend Detection, XYZ Trending, XYZ Trending" with this message also being processed through the distribution server to be disseminated for visual referencing.

Web Scraping

In embodiments of this invention the method and system leverages a combination of vendor solutions and technologies to "alert" or "inform" our subscribers of what is consider noteworthy and relevant. Web scraping allows for data enrichment within various textual message templates and provide access to additional material found within the web using hyperlinks within the news data stream that subscribers may find useful. Below is one of many examples:

Parameter: IF www.gov.com/numbers/releases.html updates website with new material THEN disseminate:

Example: "Alert! Updated Government Website Material Discovered"

This textual message template again goes through both the audio broadcast server and distribution server, with the distribution server desirably providing "Website" hyperlink to the actual website URL destination the end user is being notified about.

Thus, the invention provides a method, system, and software for compiling, sorting, searching, filtering, referencing, and manipulating news events data, such as financial market related information, to produce audio, graphical, and/or textual message formats to help provide for faster human processing of real-time market events within a graphical user interface (GUI). The invention assists in filtering relevant data from the continuous broadcast of financial news and event information, and includes different indicators to further parse and highlight relevant information.

It will be appreciated that details of the foregoing embodiments, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention, which is defined in the following claims and all equivalents thereto. Further, it is recognized that many embodiments may be conceived that do not achieve all of the advantages of some embodiments, particularly of the preferred embodiments, yet the absence of a particular advantage shall not be construed to necessarily mean that such an embodiment is outside the scope of the present invention.

What is claimed is:

1. A method for communicating information, the method comprising:
   providing and/or receiving with a data processor a continuous feed of relevant data extracted from a machine-readable data broadcast of financial news analytic data and/or a trading exchange data;
   the data processor automatically ranking the relevant data;
   the data processor automatically creating graphical output data messages from the extracted relevant data, wherein the graphical output data messages differ in content and/or format from the continuous feed of relevant data and the data broadcast;
   the data processor automatically delivering the graphical output data messages to a user device;
   the data processor automatically determining highly ranked distinct financial events from the extracted relevant data;
   the data processor automatically creating spoken audio output data messages for the highly ranked distinct financial events; and
   the data processor automatically delivering the spoken audio output data messages to the user device.

2. The method according to claim 1, further comprising automatically creating the spoken audio output data messages by automatically and electronically converting textual data and/or numerical data of the extracted relevant data to speech.

3. The method according to claim 1, further comprising automatically populating message templates with corresponding extracted relevant data to create the graphical and spoken audio output data messages.

4. The method according to claim 1, further comprising comparing at least some of the extracted relevant data to corresponding pre-established expectations and generating the graphical and/or spoken audio output data messages to indicate a difference between the extracted relevant data and the corresponding pre-established expectation.

5. The method according to claim 1, wherein the extracted relevant data comprises structured data including textual and numerical data of each of financial news events, financial news event analytics data, and/or trading exchange market data.

6. The method according to claim 1, wherein the spoken audio output data messages include changes of pitch and/or different voices for different categories and/or rankings of the relevant data.

7. The method according to claim 6, further comprising assigning one of a plurality of predetermined sound effects to each of the spoken audio output data messages as a function of a corresponding category and/or ranking of the relevant data.

8. The method according to claim 1, further comprising automatically associating one of a plurality of predetermined graphic indicators to the extracted relevant data within each of the graphical output data messages.

9. The method according to claim 8, wherein the extracted relevant data comprises structured data including textual and numerical data of each of financial news, financial news event analytics data, and/or trading exchange market data, and the plurality of predetermined graphic indicators comprise market ranking indicators.

10. The method according to claim 1, further comprising associating one of a plurality of predetermined graphic indicators to the extracted relevant data.

11. The method according to claim 10, further comprising associating a number or letter ranking to each of the plurality of predetermined graphic indicators.

12. The method according to claim 1, further comprising:
   numerically ranking the extracted relevant data for each of a plurality of predetermined categories; and
   associating a graphic indicator to the numerical ranking; and
   displaying the numerical ranking with the associated graphic indicator within a corresponding one of the graphical data output messages.

13. A method for communicating information, the method comprising:
   providing a data processor with a first plurality of ranking graphic indictors for a first ranking category, the first plurality of ranking graphic indicators selected from colors and/or shapes;
   providing the data processor with a second plurality of ranking graphic indictors for a second ranking category, the second plurality of ranking graphic indicators selected from colors and/or shapes that are each different from the first plurality of ranking graphic indicators;
   providing and/or receiving with the data processor a continuous feed of relevant data extracted from a data broadcast;
   the data processor automatically creating output data messages from the extracted relevant data, wherein the output data messages differ in content and/or format from the continuous feed of relevant data and the data broadcast;
   the data processor automatically associating one of each of the first plurality of ranking graphic indicators and the second plurality of ranking graphic indicators to the extracted relevant data of each of the output data messages; and
   the data processor automatically delivering the output data messages to a user device.

14. A recordable medium comprising encoded instructions executable on the data processor for executing the method according to claim 1.

15. A method for communicating information, the method comprising:
   providing a data processor with a plurality of predetermined message templates stored in a database;
   providing and/or receiving with the data processor relevant data extracted from a machine-readable financial news analytic data broadcast and/or a trading exchange data broadcast;

the data processor automatically determining event types within the extracted relevant data;

the data processor automatically selecting a corresponding predetermined formula for analyzing the extracted relevant data of each of the determined event types;

the data processor automatically ranking the extracted relevant data of each of the determined event types;

the data processor automatically selecting a corresponding message template from the plurality of predetermined message templates for one of the determined event types;

the data processor automatically populating the selected corresponding message template from the extracted relevant data and with a corresponding graphical indicator to create a graphical output data message;

the data processor automatically determining a highly relevant distinct financial event as a function of the rankings and automatically generating an audio broadcast for the highly relevant distinct financial event; and the data processor automatically delivering the graphical output data message and the audio broadcast to a user device.

16. The method according to claim 15, further comprising the data processor automatically selecting a corresponding audio message template and a corresponding textual/graphic message template.

17. The method according to claim 15, wherein each of the plurality of predetermined message templates is directed to a trading exchange event, a financial news release, or a financial news event.

18. The method according to claim 15, further comprising:
automatically ranking the extracted relevant data in at least one financial market sentiment category; and automatically adding a graphical indicator of the ranking to the graphical output data message.

19. A method for communicating information, the method comprising:

providing a data processor with a plurality of predetermined message templates stored in a database;

providing and/or receiving with the data processor relevant data extracted from a data broadcast;

the data processor automatically selecting a corresponding message template from the plurality of predetermined message templates for the extracted relevant data;

the data processor automatically ranking the extracted relevant data with a number and/or letter for each of a plurality of predetermined categories;

the data processor automatically populating the selected corresponding message template with the extracted relevant data to create an output data message;

the data processor automatically associating a graphic indicator comprising a color and a shape to the ranking;

the data processor automatically displaying the ranking with the associated graphic indicator within a corresponding one of the data output messages; and the data processor automatically delivering the output data message to a user device.

20. The method according to claim 19, wherein the extracted relevant data comprises structured data including textual and numerical data of each of financial news, financial news event analytics data, and/or trading exchange market data, and the graphic indicator is one of a plurality of predetermined market ranking indicators.

* * * * *